(12) United States Patent
Michenfelder et al.

(10) Patent No.: US 6,518,717 B1
(45) Date of Patent: Feb. 11, 2003

(54) WINDSCREEN WIPER DRIVE AGGREGATE AND A VEHICLE WHICH IS EQUIPPED WITH THE SAME

(75) Inventors: Gebhard Michenfelder, Lichtenau (DE); Marcellus Weber, Lauf (DE); Peter Braun, Buehlertal (DE); Michael May, Offenburg (DE); Klaus Eckert, Durbach Ebersweier (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,512
(22) PCT Filed: Jan. 29, 2000
(86) PCT No.: PCT/DE00/00255
§ 371 (c)(1),
(2), (4) Date: Sep. 29, 2000
(87) PCT Pub. No.: WO00/46083
PCT Pub. Date: Aug. 10, 2000

(30) Foreign Application Priority Data

Feb. 2, 1999 (DE) ..................................... 299 01 649 U

(51) Int. Cl.$^7$ ............................................. H02K 7/116
(52) U.S. Cl. ..................... 318/15; 318/443; 318/DIG. 2
(58) Field of Search ............................ 318/15, 70, 85, 318/146, 443, 138, DIG. 2; 15/250.13, 250.12, 250.17; 363/146

(56) References Cited

U.S. PATENT DOCUMENTS

| 4,857,812 A | 8/1989 | Mochizuki et al. |
| 5,331,257 A | * 7/1994 | Materne et al. ............... 318/85 |

FOREIGN PATENT DOCUMENTS

| DE | 44 31 152 A | 3/1996 |
| GB | 2 096 800 A | 10/1982 |
| WO | 98 26965 A | 6/1998 |

* cited by examiner

Primary Examiner—Khanh Dang
(74) Attorney, Agent, or Firm—Michael J. Striker

(57) ABSTRACT

The invention relates to a windshield wiper drive unit having a drive motor (1) and a gear (2, 3) for transmitting a rotary motion of the motor (1) to the shaft of a windshield wiper, having at least one sensor (6) for detecting a position of the shaft, and having a control circuit (4), which receives a detection signal of the sensor (6) and has one or more inputs (7) for receiving operating signals that define a desired operating state of the windshield wiper and is arranged to control a sequence of motions of the shaft as a function of the operating signal received, in which the control circuit (4) is combined with the drive motor (1) and the at least one sensor to make an integral component unit.

6 Claims, 2 Drawing Sheets

WINDSCREEN WIPER DRIVE AGGREGATE AND A VEHICLE WHICH IS EQUIPPED WITH THE SAME

BACKGROUND OF THE INVENTION

The invention relates to a windshield wiper drive unit having a drive motor and a gear for transmitting a rotary motion of the motor to the shaft of a windshield wiper, having at least one sensor for detecting a position of the shaft, and having a control circuit, which receives a detection signal of the sensor and has one or more inputs for receiving operating signals that define a desired operating state of the windshield wiper and is arranged to control a sequence of motions of the shaft as a function of the operating signal received.

This control circuit is responsible for all the relevant functions of the windshield wiper, such as wiping at different speeds, intermittent wiping with various intervals between wiping phases, triggering of a pump for a windshield washer fluid, and so forth. The at least one sensor is used to obtain the information required for controlling the sequence of motion of the wiper from the current position of the wiper, that is, whether the wiper is moving across a position at which a switching operation of the control circuit is required, whether the wiper is moving at the required speed, or whether the wiper has become stuck, for instance from an overload of snow on the window.

The more manifold and complex the possible operating states of the wiper are, the more sensors are generally necessary for controlling it, and the more information has to be exchanged between sensors, control circuit and motor. This requires a large number of lines between the motor and sensor or sensors on the one hand and the control circuit on the other. If the part of the control circuit that supplies current to the wiper operates in clocked fashion, then a complicated interference suppressor for the signals exchanged among the sensors, control circuit and motor is additionally required.

SUMMARY OF THE INVENTION

By the present invention, a windshield wiper drive unit of the type defined at the outset is created which enables simple signal transmission, with little vulnerability to interference, between the sensor or sensors, the control circuit, and the drive motor. Because these three components are in fact combined into an integral component unit, the signal paths between them are shortened considerably, and the introduction of external interference into the signal lines is reduced considerably. The integral component unit can be shielded off from external interference as a whole without difficulties, for example by a compact metal housing.

From outside, along with the requisite supply voltages, all that it receives is operating signals with which a driver of the vehicle specifies a desired operating state of the windshield wiper. These operating signals vary extremely seldom, compared to the detection signals of the sensor or sensors, and accordingly their transmission is has very low susceptibility to interference.

Further characteristics and advantages of the invention will become apparent from the ensuing description of an exemplary embodiment.

DETAILED DESCRIPTION OF THE PREFERRED EMBODIMENTS

Figure 1:
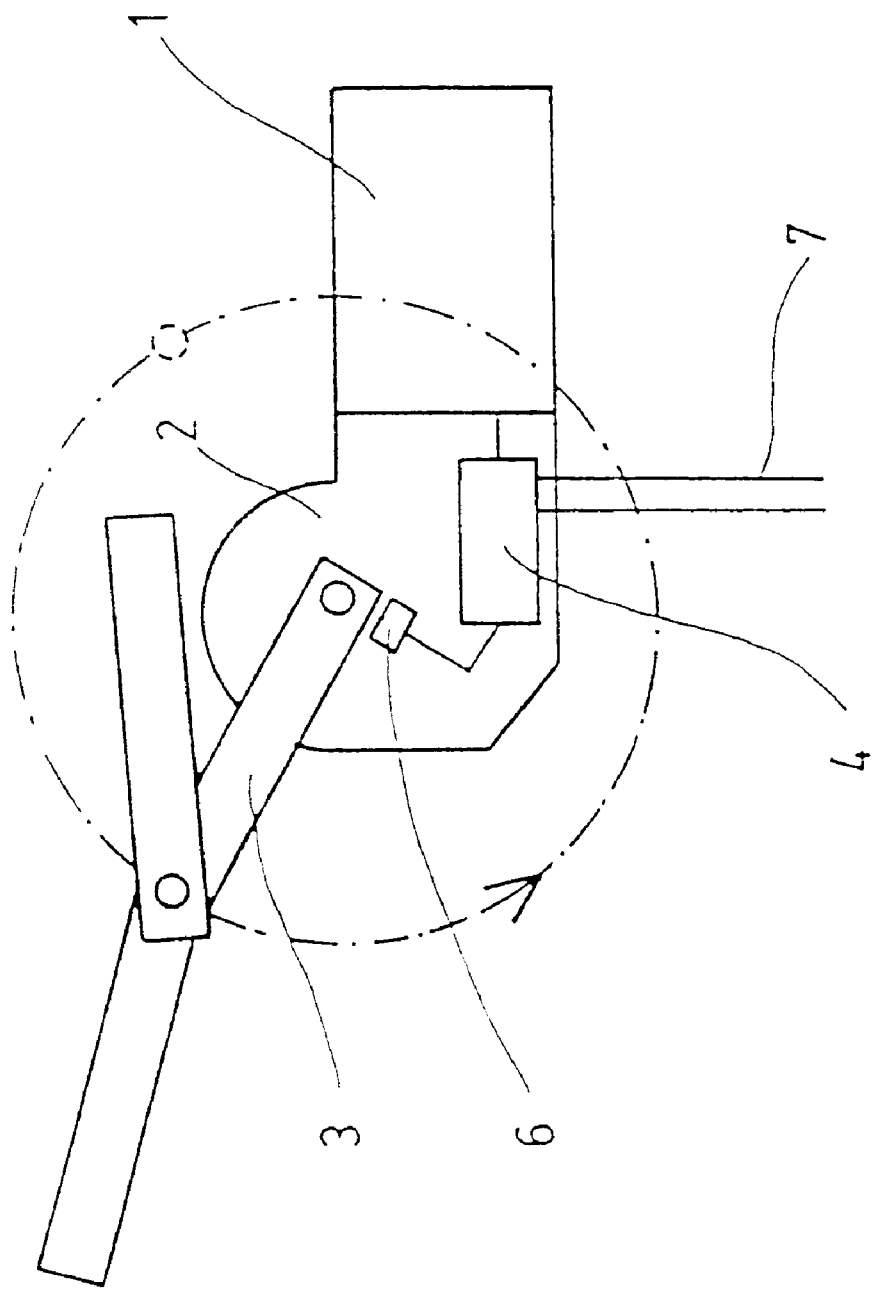
FIG. 1, highly schematically, shows a windshield wiper drive unit according to the invention.
Figure 2:
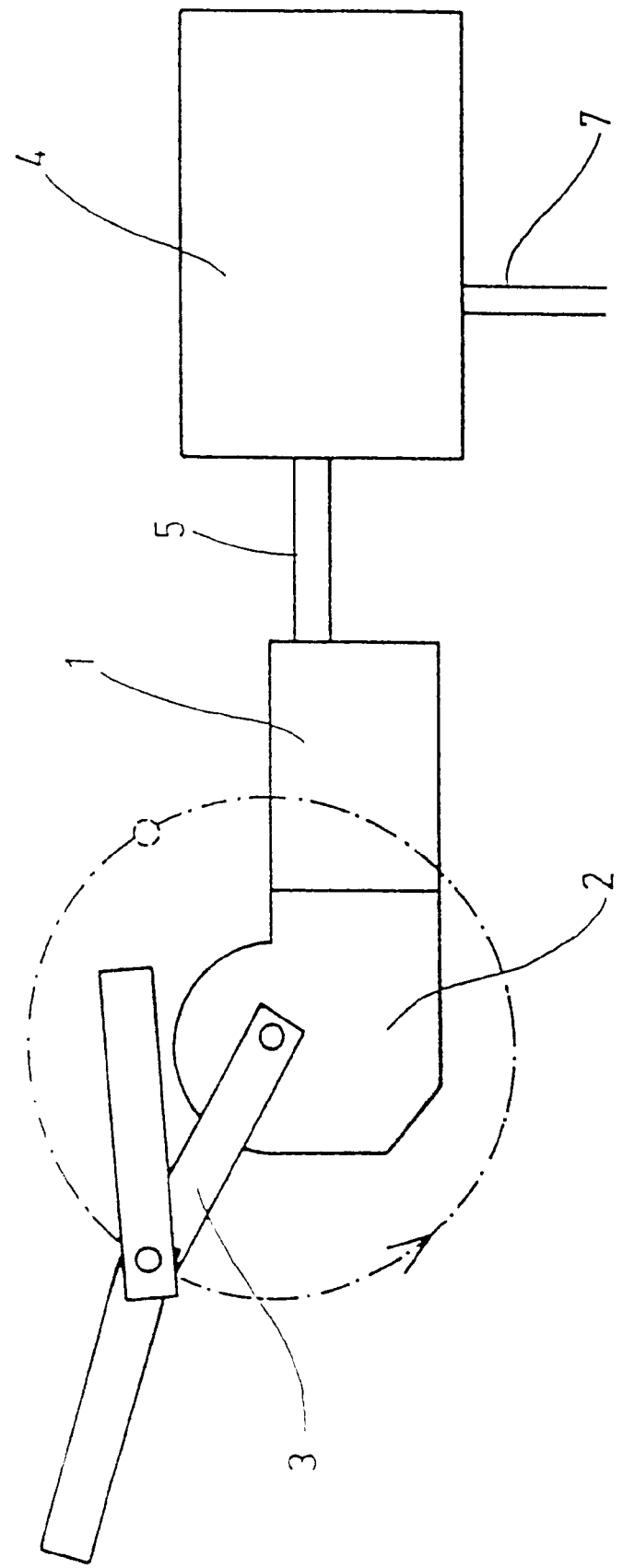
FIG. 2 for comparison shows a conventional windshield wiper drive unit.

The conventional drive unit shown in FIG. 2 includes a motor 1, which is combined with a step-down gear 2 to form a unit. One arm 3 of a pendulum gear can be mounted on a power takeoff shaft of the step-down gear 2 and converts a rotary motion in the same direction into a reciprocating rotary motion of a windshield wiper, but the reciprocating rotary motion can also be generated directly by the motor. An external central control circuit 4 is connected, via a loom 5 of cables, to the structural unit formed by the motor 1 and step-down gear 2, and by way of this unit receives signals from sensors that are mounted in the structural unit at a suitable point for monitoring the state of motion of the windshield wiper; it processes these signals in conjunction with operating signals, which are received from operating elements in the passenger compartment of the vehicle via terminals 7, and via the loom 6 of cables furnishes an operating current to the motor, which makes the motor rotate in a given direction at a desired speed.

In the windshield wiper drive unit according to the invention, a control circuit 4 is accommodated together with the motor 1 and step-down gear 2 in a common shielded housing, and forms an integral component unit with them. Sensors, such as the angle sensor 6 shown on the shaft of the arm 3 of a pendulum gear, have an only slight distance from the control circuit 4, of at most a few centimeters, and because of the short travel path of the detection signal of the sensor 6 to the circuit 4, the signal experiences little external interference. It is even possible to embody the sensor 6 together with the control circuit 4 on a common substrate, so that the installation of cables for signal transmission between the sensor and the control circuit can even be dispensed with entirely.

The output signal of the sensor 6 is evaluated exclusively by the control circuit 4. No terminal is therefore provided at which this signal is extended out of the component unit. Thus the introduction of interference via external terminals is also precluded.

The control circuit 4 includes a power end stage, which furnishes a driving current for the motor 1. Terminals 7 leading to the outside are all connected to the control circuit 4 and serve to supply current to the control circuit and to the sensors connected to it as well as the motor, and to supply the control circuit with operating signals, which a driver of the vehicle furnishes by switching control levers, and which for instance specify the desired wiping speed of the windshield wiper, intermittent wiping, and optionally the length of the intervals between wiping phases, and so forth.

To that end, individual ones of the terminals 7 can be connected directly to switches actuated by the control levers, so that the control circuit 4 detects the switching state, "on" or "off", of these switches. Alternatively to the same purpose, the operating signals can be transmitted in encoded form on a bus to the terminals 7, which is expedient especially in the case of a complex drive unit, whose control circuit is capable of performing many different functions.

In an advantageous refinement, the control circuit 4 is capable of turning a pump, used to spray the window of the vehicle with a washing fluid, on and off. This control can for instance be done such that the pump sprays the window intermittently, specifically always shortly before the windshield wiper reaches the point where the spray stream strikes the window. Washing fluid is thus prevented from flowing away unused, and the effectiveness of the washing process is improved.

The control circuit can also be used to control the cleaning of the vehicle headlights and the heating of spray nozzles for the cleaning fluid and optionally for controlling a supply line of the cleaning fluid from a supply container to the nozzles.

Because of the low susceptibility to external interference, the invention makes it possible to use economical standard components in the control circuit. Thus for evaluating the detection signals of the sensor (or sensors) and the operating signals and for triggering the power end stage, a clock-controlled circuit, such as a microprocessor or microcontroller, can be employed. The omission of signal lines make for further economies. Because of the improved reliability of transmission of position detection information from the sensor to the control circuit, it is furthermore possible to dispense with a short-circuit protector in the motor end stage of the control circuit.

The invention is usable both for motors with a fixed direction of rotation and for reversible motors.

What is claimed is:

1. A windshield wiper drive unit comprising a drive motor (1) and a gear (2, 3) for transmitting a rotary motion of the motor (1) to a shaft of a windshield wiper; at least one sensor (6) for detecting a position of said shaft, and a control circuit (4), which receives a detection signal of the sensor (6) and has at least one input (7) for receiving operating signals that define a desired operating state of the windshield wiper, said control circuit controlling a sequence of motions of said shaft as a function of an operating signal received, said control circuit (4) being combined with said drive motor (1) and said at least one sensor into one integral component unit, said control circuit having one control output for controlling a function of a windshield washer fluid source as a function of the position of said shaft of said windshield wiper.

2. The windshield wiper drive unit of claim 1, wherein said control circuit (4) has one control output for controlling a function of a heater for spray nozzles and of a supply line from a supply container for a cleaning fluid that leads to the spray nozzles.

3. A vehicle having a windshield wiper drive unit of claim 1, wherein said at least one input (7) is formed by an interface with a bus system of the vehicle.

4. A vehicle having a windshield wiper drive unit of claim 1, wherein said at least one input (7) is connected directly to control switches in a passenger compartment of the vehicle.

5. A windshield wiper driver unit comprising a drive motor (1) and a gear (2, 3) for transmitting a rotary motion of the motor (1) to a shaft of a windshield wiper; at least one sensor (6) for detecting a position of said shaft, and a control circuit (4), which receives a detection signal of the sensor (6) and has at least one input (7) for receiving operating signals that define a desired operating state of the windshield wiper, said control circuit controlling a sequence of motions of said shaft as a function of an operating signal received, said control circuit (4) being combined with said drive motor (1) and said at least one sensor into one integral component unit, said control circuit having one control output for controlling a function of a windshield washer fluid source as a function of the position of said shaft of said windshield wiper so as to provide spraying of a window of a vehicle intermittently.

6. A windshield wiper driver unit comprising a drive motor (1) and a gear (2, 3) for transmitting a rotary motion of the motor (1) to a shaft of a windshield wiper; at least one sensor (6) for detecting a position of said shaft, and a control circuit (4), which receives a detection signal of the sensor (6) and has at least one input (7) for receiving operating signals that define a desired operating state of the windshield wiper, said control circuit controlling a sequence of motions of said shaft as a function of an operating signal received, said control circuit (4) being combined with said drive motor (1) and said at least one sensor into one integral component unit, said control circuit having one control output for controlling a function of a windshield washer fluid source as a function of the position of said shaft of said windshield wiper so as to provide spraying of a window of a vehicle intermittently, said control circuit turning a pump used to spray a window of a vehicle with a washing fluid on and off, so that the pump sprays the window intermittently shortly before the windshield wiper reaches a point where a spray stream strikes the window.

* * * * *